(12) United States Patent
Baek (10) Patent No.: US 7,344,241 B2
(45) Date of Patent: Mar. 18, 2008

(54) GLASSES HAVING FRAME FOR COMBINED USE WITH A CAP

(76) Inventor: Sang Hyun Baek, 413-25 Gil 1-dong, Kangdong-gu, Seoul (KR) 134-011

( * ) Notice: Subject to any disclaimer, the term of this patent is extended or adjusted under 35 U.S.C. 154(b) by 0 days.

(21) Appl. No.: 11/186,381

(22) Filed: Jul. 21, 2005

(65) Prior Publication Data

US 2006/0017879 A1 Jan. 26, 2006

(30) Foreign Application Priority Data

Jul. 23, 2004 (KR) ...................... 10-2004-0057859

(51) Int. Cl.
*G02C 3/00* (2006.01)
(52) U.S. Cl. .............................. 351/155; 351/116; 2/10
(58) Field of Classification Search ................ 351/155, 351/41, 158, 116; 2/10, 209.13, 12, 13
See application file for complete search history.

(56) References Cited

U.S. PATENT DOCUMENTS

| | | | |
|---|---|---|---|
| 4,636,048 A | 1/1987 | Jones | |
| 4,869,586 A | 9/1989 | Chung | |
| 5,692,234 A * | 12/1997 | Yuen | ............................... 2/10 |
| 6,174,058 B1 | 1/2001 | Hsiao | |
| 6,275,992 B1 * | 8/2001 | Bondy | ............................. 2/10 |

* cited by examiner

*Primary Examiner*—Hung X. Dang
(74) *Attorney, Agent, or Firm*—Hamre, Schumann, Mueller & Larson, P.C.

(57) ABSTRACT

Glasses having a frame for a combined use with a cap which can be attached to the visor of the cap, or when the cap is not worn, can be worn as an ordinary pair of glasses. The glasses having a frame for a combined use with a cap include the main body of glasses having a reinforce unit integrally formed with the glasses, on top of a lens unit to which clips or earpieces are coupled; a central frame which is fixedly coupled to the center of the reinforce unit of the main body of glasses; and a pair of clips and a pair of earpieces that are coupled to both ends of the reinforce unit of the main body of glasses and the central frame, and by doing so, strengthen the coupling power of the clips and the earpieces such that even when the user performs heavy exercise or the shape of the visor of a cap is changed by an external impact, the clips or earpieces are not separated from the main body of glasses and the central frame, and the clips and the earpieces can be easily attached and detached.

14 Claims, 9 Drawing Sheets

GLASSES HAVING FRAME FOR COMBINED USE WITH A CAP

BACKGROUND OF THE INVENTION

1. Field of the Invention

The present invention relates to glasses having a frame for a combined use with a cap, which can be used by being attached to the visor of a cap, or when a cap is not worn, can be worn as an ordinary pair of glasses, and more particularly, to glasses having a frame for a combined use with a cap, which include the main body of glasses having a reinforce unit integrally formed with the glasses, on top of a lens unit to which clips or earpieces are coupled; a central frame which is fixedly coupled to the center of the reinforce unit of the main body of glasses; and a pair of clips and a pair of earpieces that are coupled to both ends of the reinforce unit of the main body of glasses and the central frame, and by doing so, strengthen the coupling power of the clips and the earpieces such that even when the user performs heavy exercise or the shape of the visor of a cap is changed by an external impact, the clips or earpieces are not separated from the main body of glasses and the central frame, and the clips and the earpieces can be easily attached and detached.

2. Description of the Related Art

Generally, a cap to protect the head of a wearer from sunlight and others has a visor at the front of the cap in most cases such that the visor prevents the face of the wearer from being directly exposed to sunlight. Also, besides the cap, sunglasses or safety glasses are worn to protect eyes from sunlight.

Accordingly, it had been recognized previously that when a person wears a cap, the person should wear sunglasses or safety glasses separately. However, recently, in order to reduce the inconvenience of separate wearing, various types of glasses attachable to a cap that enable wearing sunglasses or safety glasses when a cap is worn have been developed and used.

Figure 1:
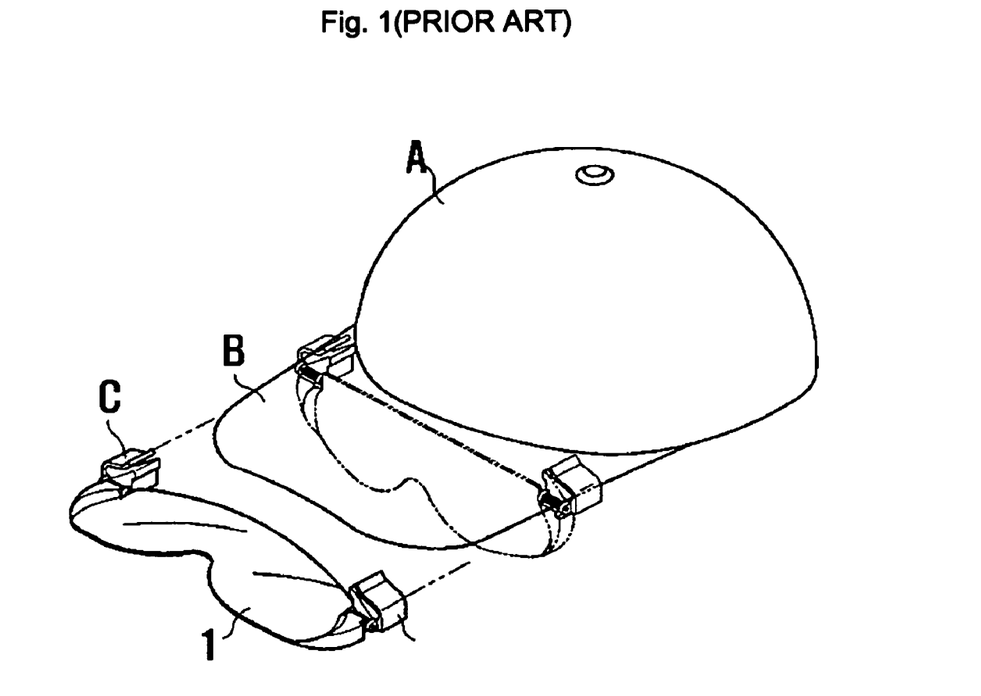
FIG. 1 is a diagram showing the state in which the conventional pair of glasses for a combined use with a cap is mounted.

FIG. 1 is a diagram showing an example of the conventional glasses for a combined use with a cap, which can be coupled to a cap (A) having a visor (B) and can be flipped back and forth.

The glasses for a combined use with a cap are formed with the main body of glasses 1 having a variety of shapes and colors, and a pair of clips (C) attached to both ends of the main body of the glasses. At this time, the clips have a variety of units so that when the main body of the glasses is coupled with the cap visor (B), the main body of the glasses can be flipped up and down.

However, since the clip (C) is fixedly attached to the glasses for a combined use with a cap, the glasses can be attached only when a cap with a visor is worn. Accordingly, it causes a problem that when a cap without a visor is worn or a cap is not worn, a separate pair of sunglasses or safety glasses should be used.

In addition, when the clip or the main body of the glasses are damaged, the glasses for a combined use with a cap cannot be coupled to the visor of a cap such that the glasses themselves should be bought again, which may in turn cause a financial burden.

To solve the problem, recently, glasses for a combined use with a cap which are used when attached to a cap by coupling clips with the glasses, or are used as an ordinary pair of glasses by coupling earpieces with the glasses have been developed.

Figure 2:
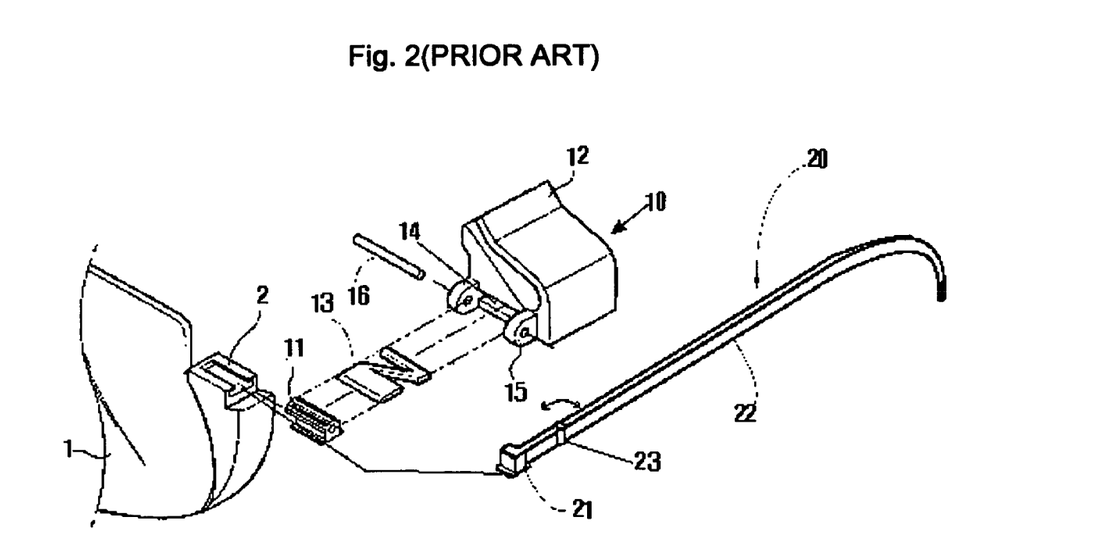
FIG. 2 is an exploded perspective view of a side of the main body of glasses of an example of the conventional pair of glasses for a combined use with a cap.

FIG. 2 is a diagram showing glasses for a combined use with a cap. The glasses for a combined use with a cap are formed with the main body 1 in which detachable grooves 2 for attaching or detaching clips and earpieces are integrally formed at tops of both ends of the main body; a pair of clips 10, each formed with a gear 11 having a detachable unit that is attached to or detached from the detachable groove 2 of the main body of the glasses 1, a stopper 13 for controlling the gear 11, a stopper insertion unit 14 for inserting the stopper 13, an axis bearing unit 15 for bearing the fixing axis 16 of the gear 11, and a clip unit 12 which is attached to or detached from the visor of a cap; and a pair of earpieces 20, each formed with a glasses coupling unit 21 for attaching to or detaching from the detachable groove 2 of the main body of the glasses, an earpiece body 22 for mounting the glasses on an ear, and a rotation member 23 which connects the coupling unit 21 and the earpiece body 22 and enables the earpiece body 22 to be folded inwards.

However, the glasses have the following problems. That is, in the main body of the glasses for a combined use with a cap thus constructed, in order to form the detachable groove 2, both ends of the main body of the glasses 1 should be formed to be thick such that the main body of the glasses cannot be made in a variety of shapes. In addition, since the clip 10 and the earpiece 20 are simply inserted into the detachable groove 2 to couple the glasses, if the visor of a cap is broadened or the width of the visor is greater than the interval between clips, the clips can be easily separated from the main body of the glasses. If a person with a wider face wears the glasses, during a process for opening the earpieces, the earpieces can be easily separated from the main body of the glasses, and if pressure is put on the detachable groove 2, the joint part between the main body of the glasses and the detachable groove can be easily damaged.

SUMMARY OF THE INVENTION

The present invention provides glasses having a frame for a combined use with a cap in which on top of the main body of the glasses, a reinforce unit thicker than a lens unit is integrally formed or a hanging threshold with a predetermined length is formed on top of each of both ends of the main body of the glasses, and a central frame is fixedly installed on the center of the top of the main body of the glasses, and clips or earpieces that are used with being coupled with both ends of the central frame and the main body of the glasses are disposed. By doing so, without a separate tool or component, clips and earpieces can be easily attached or detached, and the frame can prevent the main body of the glasses from being easily deformed or damaged by heavy exercise or an external impact.

Also, the clips and earpieces are coupled with the reinforce unit of the main body of the glasses or the hanging threshold formed on top of each of both ends, and in a state where the main body of the glasses is coupled, the clips or the earpieces are once more coupled to both ends of the central frame such that the coupled clips are prevented from being easily separated from the main body of the glasses by an external impact or deformation of the visor of the cap, and even though the earpieces are wide opened, the coupling power with the central frame prevents the earpieces from being separated.

That is, the purpose of the present invention is to improve the coupling intensity of the main body of the glasses with the clips or the earpieces and to make attachment and detachment easier such that the glasses having a frame for a combined use with a cap can be conveniently carried and used.

According to an aspect of the present invention, there is provided glasses having a frame for a combined use with a cap including: a main body of glasses which has a lens unit and a reinforce unit integrally formed with the glasses, on top of the lens unit to which clips or earpieces are coupled; a central frame which is fixed by being inserted into the reinforce unit on the top of the main body of the glasses and in which clip or earpiece frame fixing panel coupling units are formed on the top surface of both side ends of the central frame; a pair of clips each having a clip frame which is inserted inwardly into and coupled with an end of the reinforce unit of the main body of the glasses, and in which a frame fixing panel that is coupled with the clip or earpiece frame fixing panel coupling unit of the central frame is integrally formed on the inner top end of the clip frame, and a clip unit for adjusting the angle of the main body of the glasses, on the top surface of the clip frame; and a pair of earpieces each having an earpiece frame which is inserted inwardly into and coupled with an end of the reinforce unit of the main body of the glasses, and in which a frame fixing panel that is coupled with the clip or earpiece frame fixing panel coupling unit of the central frame is integrally formed on the inner top end of the earpiece frame, and an earpiece body which is connected outwardly to the earpiece frame rotatably by a rotation member, wherein any one pair of the clips and earpieces is selected to replace the other.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

The present invention will now be described more fully with reference to the accompanying drawings, in which exemplary embodiments of the invention are shown.

Figure 3:
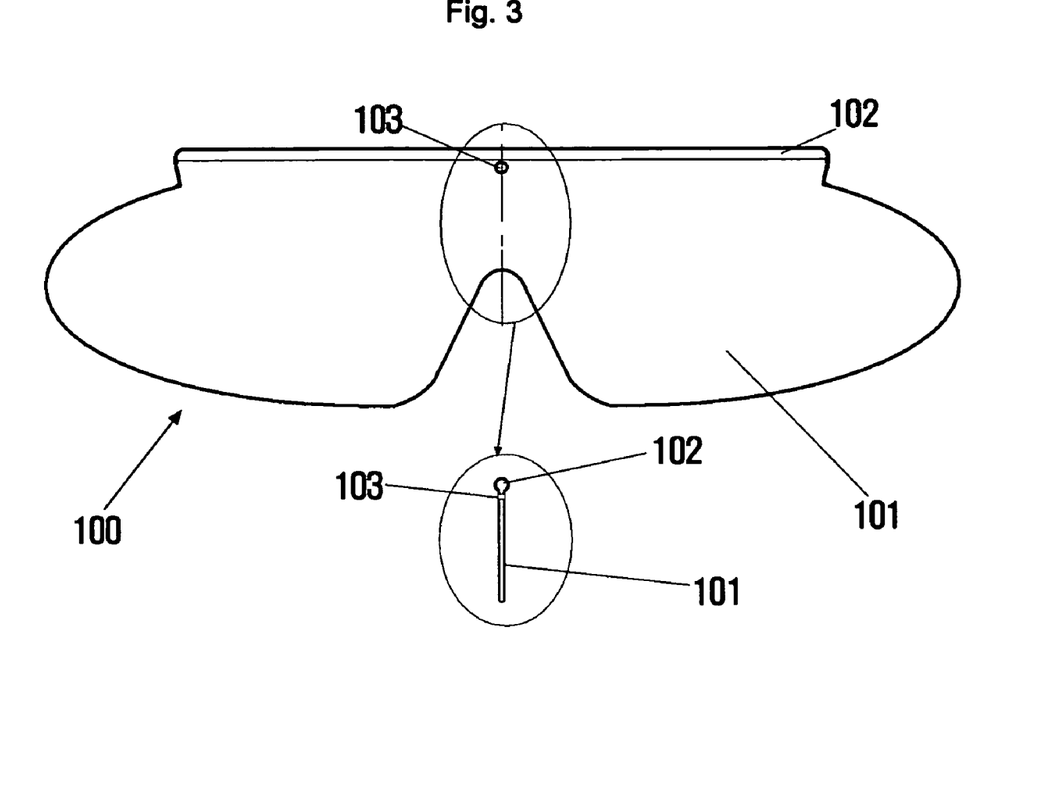
FIG. 3 is a front view of a preferred embodiment of the main body of glasses forming the glasses having a frame for a combined use with a cap according to the present invention.

First, FIG. 3 shows an embodiment of the main body of glasses forming the glasses having a frame for a combined use with a cap according to the present invention. The main body of the glasses 100 is formed with a lens unit 101 formed in a variety of shapes with a predetermined thickness, and a reinforce unit 102 which is formed on the top of the lens unit 101 to be thicker than the lens unit 101. At this time, the main body of the glasses 100 formed with the lens unit 101 and the reinforce unit 102 is formed as one body by a method such as injection molding. Also, the vertical section of the reinforce unit can be formed in a variety of shapes such as a round shape, a rectangular shape, or an inverted triangle shape, and at the center of the upper part of the lens unit, a central frame fixing hole 103 for fixing a central frame, which will be explained later, is formed.

Figure 4:
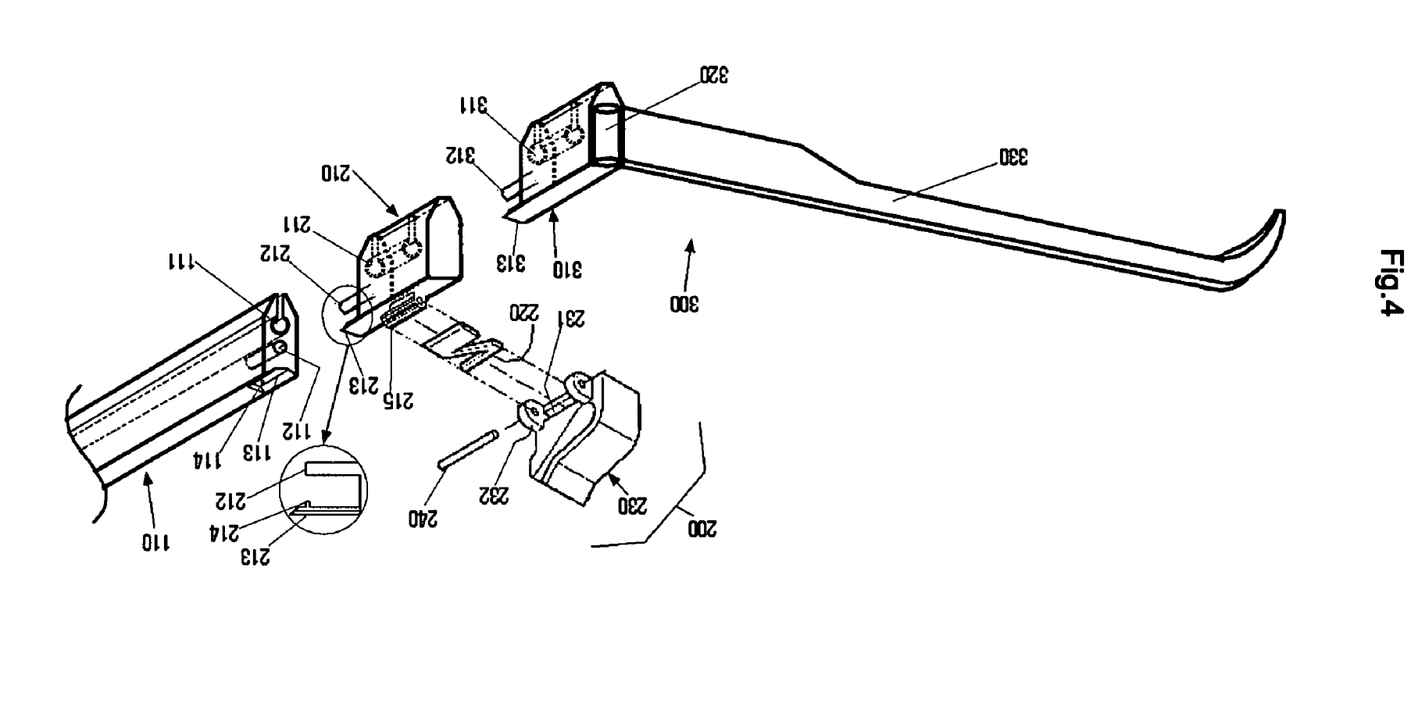
FIG. 4 is an exploded perspective view of embodiments of part of a central frame to be coupled with the main body of glasses of FIG. 3 and a clip and an earpiece attachable to both sides of the central frame and the main body of glasses.

Next, FIG. 4 shows embodiments of part of a central frame to be coupled with the main body of the glasses 100 formed as shown in FIG. 3, and a clip 200 and an earpiece 300 attachable to the frame 110. The central frame 110 is formed to be a bar with a section of a variety of shapes, and to have a curve identical to or greater than that of the main body of the glasses 100. At the lower part of the central frame 110, a glasses body coupling unit 111 is formed as a hole connecting both ends of the central frame 110 so as to be coupled with the reinforce unit 102 of the main body of the glasses 100. At the upper part of each of both side surfaces, a clip or earpiece frame insert insertion hole 112 to which a frame insert 212 and 312 formed on the inner side surface of a clip frame 210 or an earpiece frame 310 is inserted and coupled is formed with a predetermined depth. Also, on the top surface of each of both side ends of the central frame 110, a frame fixing panel coupling unit 113 to which a clip or earpiece frame fixing panel 213 or 313 formed in a panel shape by extending the top surface of the clip frame 210 or the earpiece frame 310 is coupled is formed with a predetermined depth. On one side of the coupling unit 113, a frame fixing panel protrusion fixing hole 114 to which a frame fixing panel protrusion 214 formed on the bottom surface of the frame fixing panel 213 and 313 is inserted and fixed is formed.

Meanwhile, the clip 200 is formed with the clip frame 210, a stopper 220, and a clip unit 230. The clip frame 210 is formed such that the section of the clip frame is identical to that of the central frame 110, and on the bottom surface of the clip frame 210, a glasses body coupling unit 211 with a predetermined depth is formed so as to be coupled with the reinforce unit 102 of the main body of the glasses 102. Also, on the upper part of the inner side surface of the clip frame 210, a frame insert 212 which is inserted into the clip or earpiece frame insert insertion hole 112 formed on one side surface of the central frame 110 is formed. At this time, the insert 212 may be formed by an injection molding method with the same material as the frame, or in order to prevent the insert 212 from being broken by an external impact when the clip is coupled, may be formed fixedly to the clip frame by using a metal bar such as an aluminum bar, through an insert injection molding method. Also, on the top end of the inner side surface of the clip frame 210, the frame fixing panel 213 with a panel shape, which is coupled with the clip or earpiece fixing panel coupling unit 113 formed on the top surface of both ends of the central frame 110 and is formed with the same depth and thickness as those of the coupling unit 113, is extended and integrally formed. On one side of the bottom surface of the fixing panel 213, a frame fixing panel protrusion 214 is formed at a position corresponding to the fixing hole 114 of the central frame 110. On the top surface of the clip frame 210, a gear is integrally formed such that the clip can be rotated back and forth to a predetermined angle.

Next, the clip unit 230 is coupled with the gear 215 formed integrally on the top surface of the clip frame, and the clip unit 230 can be coupled with the visor of a cap. The clip unit 230 includes: a clip body formed with a stopper insertion unit which is formed on the lower end of the clip unit 230 and in which a stopper 220 for controlling rotation of the gear is embedded, and an axis bearing unit 232 which is formed on both ends of the opening of the stopper insertion unit 231 and coupled with the gear 215; and a gear fixing axis 240 for fixedly installing the stopper 220 controlling the angle of the gear coupled with the clip body, and the gear 215 to the axis bearing unit 232 of the clip body.

Next, the earpiece is formed with an earpiece frame 310, a rotation member 320 installed on the outer side surface of the earpiece frame 310, and an earpiece body which is installed being connected to the rotation member 320 and can be folded or unfolded.

The earpiece frame 310 has the same structure as that of the clip frame 210 described above, except only the gear 215, and the structures and functions of the frame insert 312, the fixing panel 313, and the fixing panel protrusion (not shown) formed on the earpiece frame 310 are the same as those of the clip frame 210, and therefore further explanation will be omitted.

Also, on the outer side surface of the earpiece frame 310, the rotation member 320 is installed and on the rotation member 320, the earpiece body 330 is connected and installed. For the rotation member 320 and the earpiece body, those for ordinary glasses are employed.

The shapes of the clip and earpiece frames can be formed in a variety of shapes, with a varying length depending on the width of the main body of the glasses.

Figure 5:
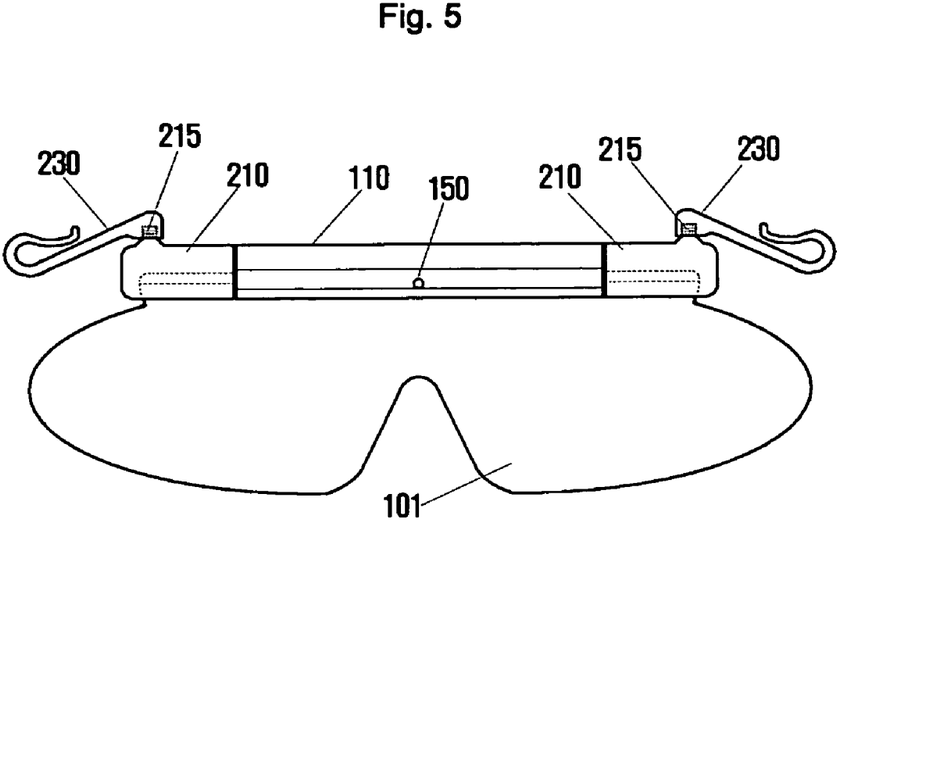
FIG. 5 is a front view of an embodiment in a state in which clips are coupled with the main body of glasses forming the glasses having a frame for a combined use with a cap according to the present invention.

FIG. 5 is diagram showing a state in which the central frame and the clip are coupled with the main body of the glasses. In the central frame 110, on one surface at the center of inside the glasses body coupling unit 111, to which the reinforce unit 102 of the main body of the glasses 100 can be inserted, a central frame fixing protrusion 150 with a hemisphere shape is formed such that the central frame fixing protrusion 150 can be coupled and fixed to the central frame fixing hole 103 of the main body of the glasses 100. Since the main body of the glasses is formed in a curve shape and has elasticity, if the shape of the central frame is formed to have a bigger curve than that of the main body of the glasses, when the central frame is inserted into the main body of the glasses, a tensile stress is applied to the central frame such that the central frame can be fixed robustly to the main body of the glasses.

Next, if the clip 200 is pushed inwardly from either of both side surfaces of the reinforce unit of the top end of the main body of the glasses 100 to which the central frame 110 is coupled, the frame insert 212 and the frame fixing panel 213 of the clip frame 210 are inserted into and coupled with the frame insert hole 112 and the frame fixing panel coupling unit 113, respectively, formed on each of both ends of the central frame 110. At this time, the frame fixing panel protrusion 214 formed on the bottom part of the frame fixing panel 213 is coupled with the frame fixing panel protrusion fixing hole 114 such that the clip 200 is prevented from being separated to the right or left from the central frame 110. Also, if the frame fixing panel protrusion 214 is positioned at the fixing hole 114, as the fixing panel protrusion is inserted and coupled, the height of the central frame 110 comes to be the same as that of the top surface of the clip frame.

Figure 6:
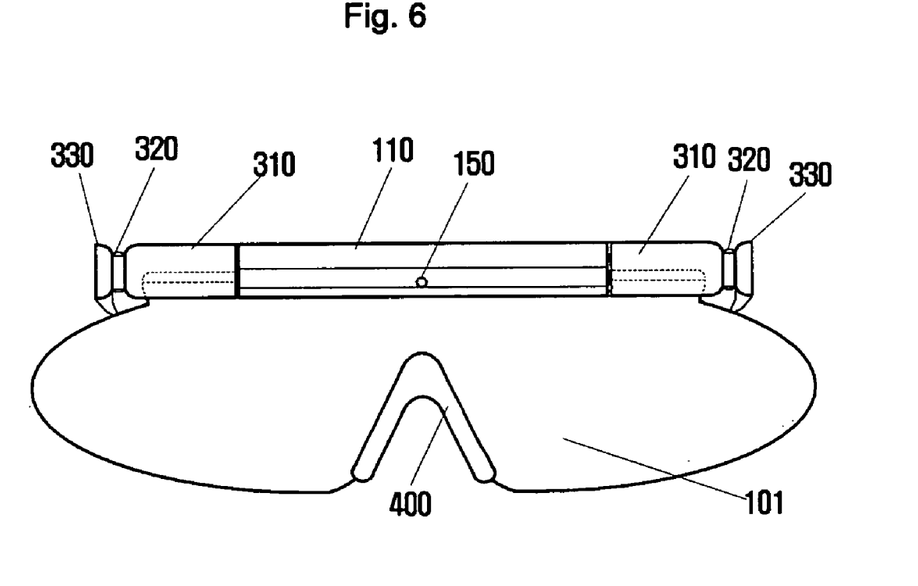
FIG. 6 is a front view of an embodiment in a state in which earpieces are coupled with the main body of glasses forming the glasses having a frame for a combined use with a cap according to the present invention.

FIG. 6 is diagram showing the central frame 110 forming the glasses having a frame for a combined use with a cap according to the present invention, and the earpiece 300 coupled with the central frame 110. Since the earpiece frame 310 is coupled with the central frame 110 in the same manner as the clip frame 210 is coupled with the central frame 110 in FIG. 5, further explanation will be omitted.

At this time, when the earpiece 300 is coupled, a nose pad 400 with a soft quality is attached to the center of the bottom end of the main body of the glasses 100 such that the main body of the glasses 100 is not in direct contact with the nose of a wearer. The nose pad 400 is formed in a reverse V shape according to the shape of the center of the bottom end of the main body of the glasses 100, and a groove into which the main body of the glasses 100 can be inserted is formed along the outer-circumference surface of the nose pad 400 such that it can be coupled with the main body of the glasses 100. That is, since the nose pad 400 is made of soft rubber and the like, a groove in a small slit shape thinner than the lens unit of the main body of the glasses is formed in order for the main body to be forcibly inserted, such that other additional parts are not needed.

Figure 7:
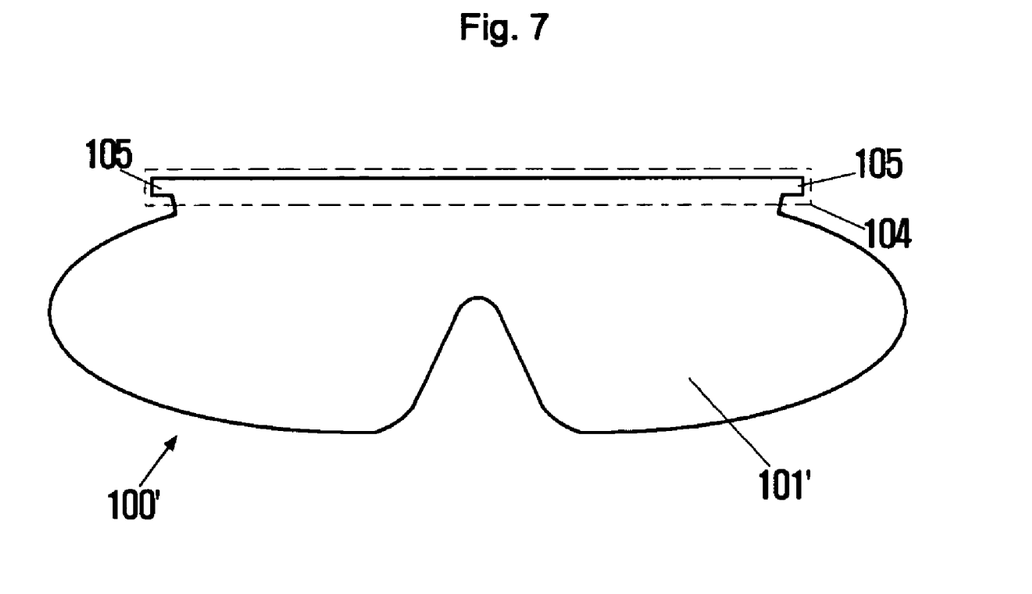
FIG. 7 is a front view of another preferred embodiment of the main body of glasses forming the glasses having a frame for a combined use with a cap according to the present invention.

Next, FIG. 7 is a diagram of another preferred embodiment of the main body of glasses 100' forming glasses having a frame for a combined use with a cap according to the present invention. The main body of the glasses 100' is formed with a lens unit 101', a frame coupling unit 104 integrally formed on the top end of the lens unit 101', and a hanging threshold 105 which is formed with a predetermined length at each of both ends of the frame coupling unit 104 and is coupled with the clip or earpiece frame. At this time, the hanging threshold 105 is an element performing the same function as that of the reinforce unit of FIG. 3. Since when the main body of the glasses is manufactured by using a transparent panel in the form of a film such as a polarization film, the reinforce unit cannot be formed, instead of the reinforce unit the hanging threshold is to prevent the clip or the earpiece from being separated from the top part of the main body of the glasses. In order to produce the main body of the glasses 101', a large sheet of film is cut to have a hanging threshold, through a heating processing process, a desired shape is obtained, and then a main body is manufactured.

Figure 8:
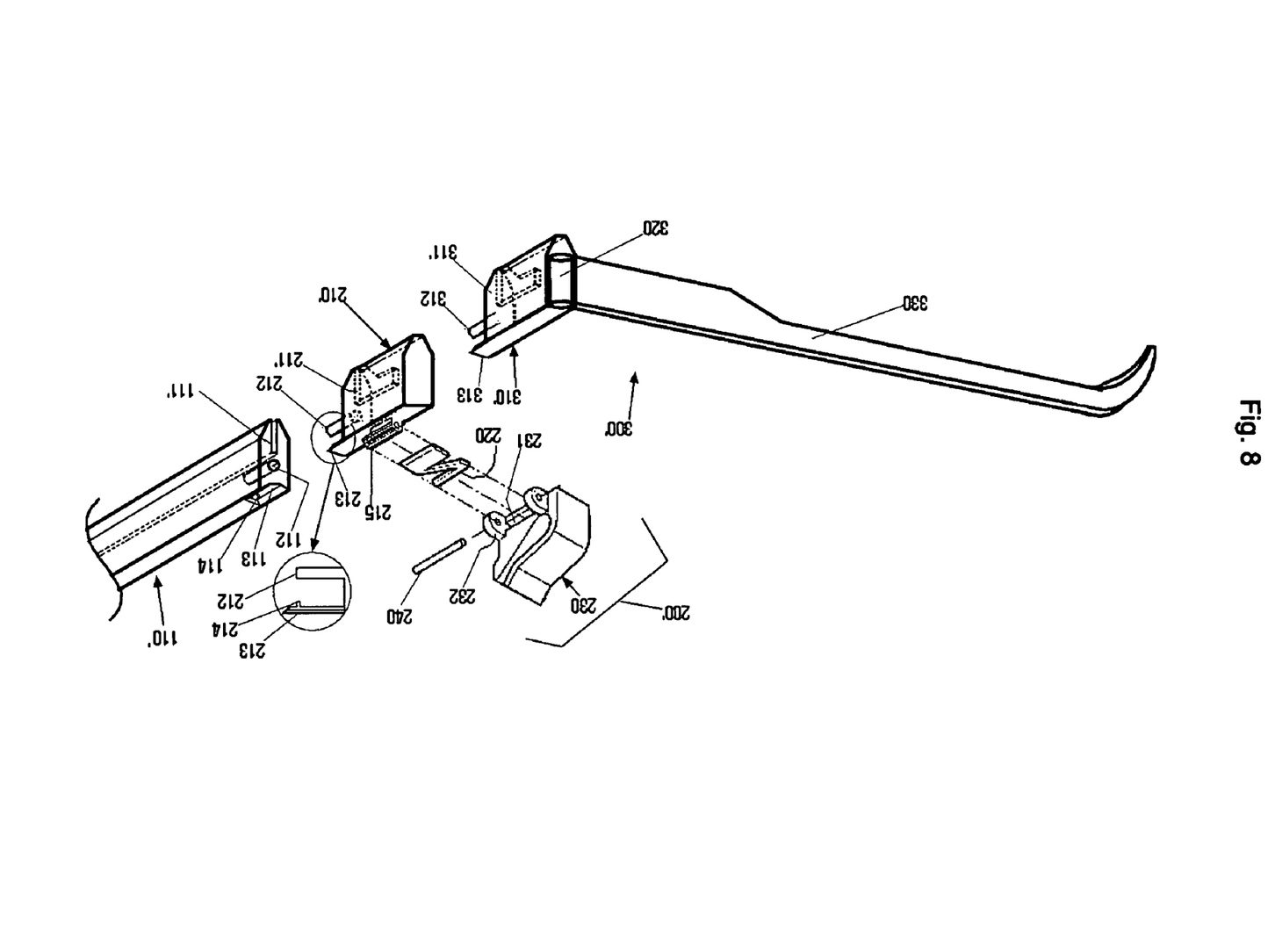
FIG. 8 is an exploded perspective view of embodiments of part of a central frame to be coupled with the main body of glasses of FIG. 7 and a clip and an earpiece attachable to both sides of the central frame and the main body of glasses.

Next, FIG. 8 is a diagram of a central frame 110', a clip 200' and an earpiece 300' coupled to the main body of the glasses 100'. In the central frame 110', formed are a glasses body insertion hole 111', a clip or earpiece frame insert insertion hole 112, a clip or earpiece frame fixing panel coupling unit 113, and a frame fixing panel protrusion fixing hole 114. At this time, inside the glasses body insertion hole 111', a central frame fixing protrusion 150 with a hemisphere shape may be formed.

Also, the clip 200' is formed with a clip frame 210', a stopper 220 and a clip unit 230'. The structures of a frame insert 212, a frame fixing panel 213, and a frame fixing panel protrusion 214 formed on the inner side surface of the clip frame 210' are the same as those explained with reference to FIG. 4, but in the shape of the glasses body hanging threshold insertion hole 211', a hole with at least the same size as that of the hanging threshold 105 is formed so that the hanging threshold 105 formed on the side surface on the top end of the main body of the glasses as shown in FIG. 7 can be inserted into and coupled with the hole. Also, the structures and functions of a gear 215, the clip unit 230', a stopper 220, a gear fixing axis 240, and the clip body are the same as those in the embodiment of FIG. 4.

Next, an earpiece 300' is formed with an earpiece frame 310', a rotation member 320, and an earpiece body 330'. At this time, the shape of the hanging threshold insertion hole 311' is the same as that of the hanging threshold insertion hole 211' and the structures and functions of the rotation member 320 and the earpiece body 330' are the same as those explained in the embodiment of FIG. 4.

Also, when the earpiece 300' is coupled, a nose pad 400 with a soft quality as described above is attached to the center of the bottom end of the main body of the glasses 100' such that the main body is not in direct contact with the nose of a wearer.

The method for coupling the clip 200' and the earpiece 300' with the central frame 110' coupled with the main body of the glasses 100' is the same as explained in the embodiment of the FIG. 4.

Figure 9:
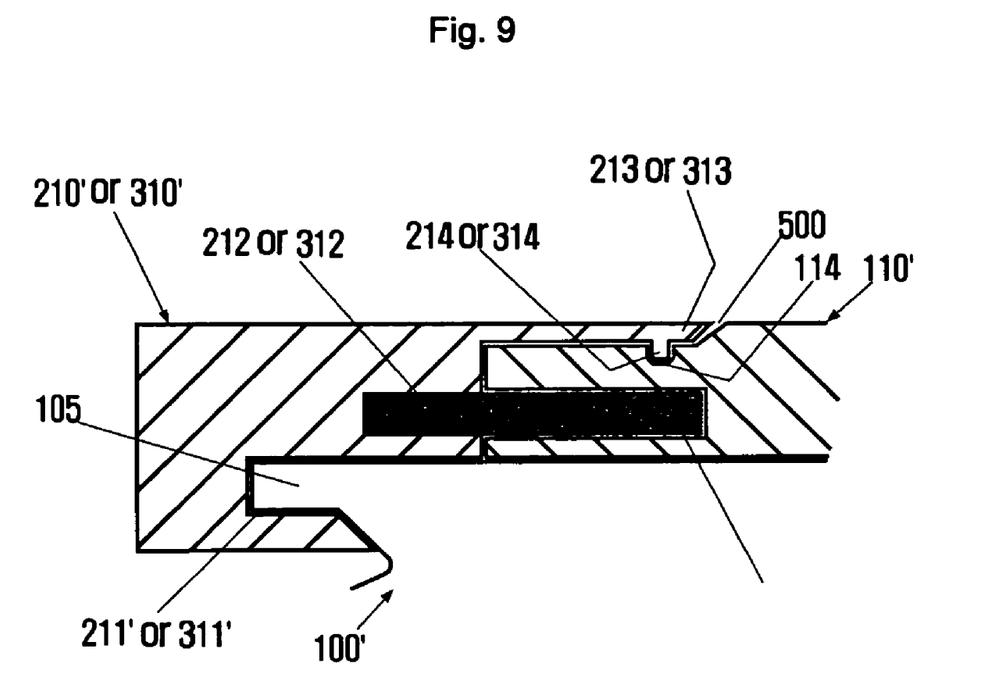
FIG. 9 is a partial sectional view of a state in which the main body of glasses of FIG. 7 is coupled with the central frame and the clip or the earpiece frame of FIG. 8.

Next, FIG. 9 is a diagram showing a state in which the clip frame 210' or the earpiece frame 310' of FIG. 8 is coupled with the main body of the glasses 100' and the central frame 110'. By the clip or earpiece frame hanging threshold 105 which is inserted into and coupled with the glasses body hanging threshold insertion hole 211' or 311', the clip frame 210' or the earpiece frame 310' can prevent the main body of the glasses 100' from being separated downward from the central frame 110' and the clip 200' and the earpiece 300'. In relation to the central frame 110, by the frame fixing panel protrusion 214 or 314 of the frame fixing panel 213 or 313, the clip 200' and the earpiece 300' are prevented from being separated aside.

At this time, at the joint part of the fixing panel 213 or 313 and the fixing panel coupling unit 113, an opening 500 into which a thin panel, such as a fingernail or a coin, can be inserted is formed such that the fixing panel can be easily lifted up and separated.

Figure 10:
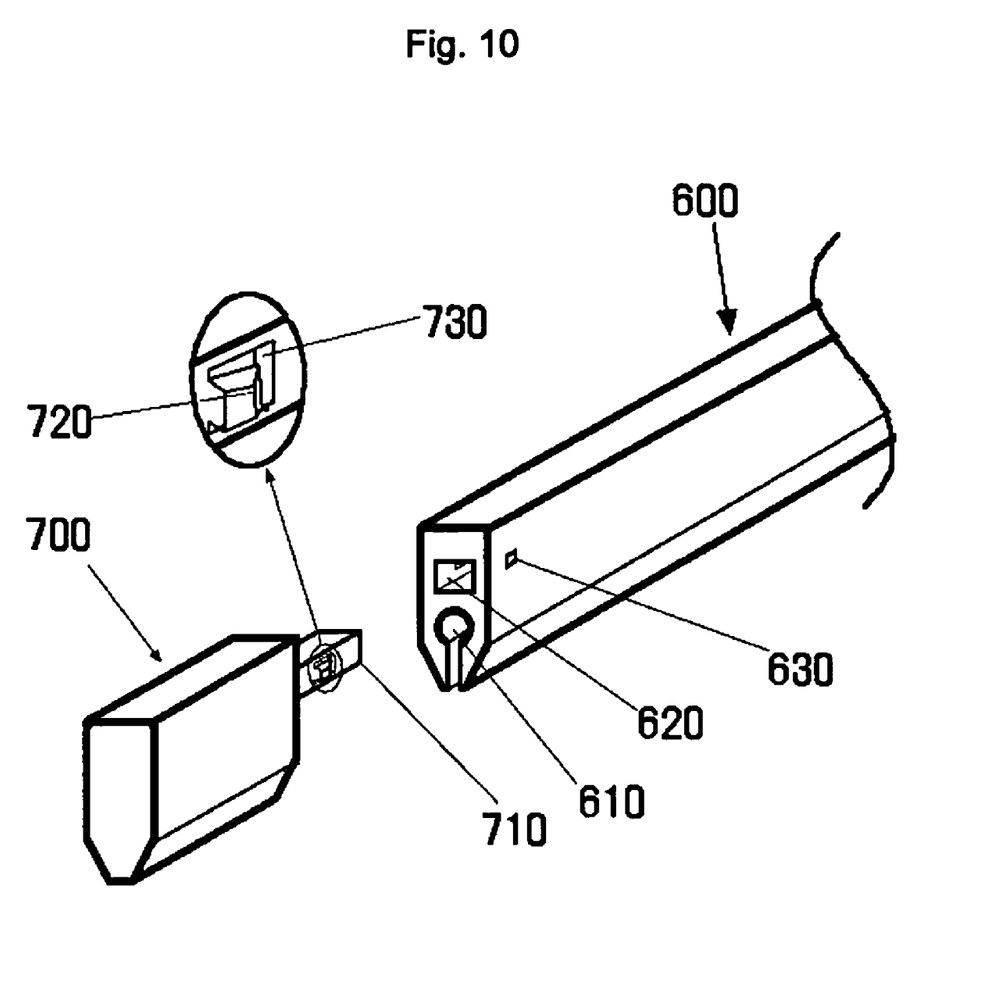
FIG. 10 is a partial perspective view of another embodiments of a central frame and a clip or an earpiece of glasses having a frame for a combined use with a cap according to the present invention.
Figure 11:
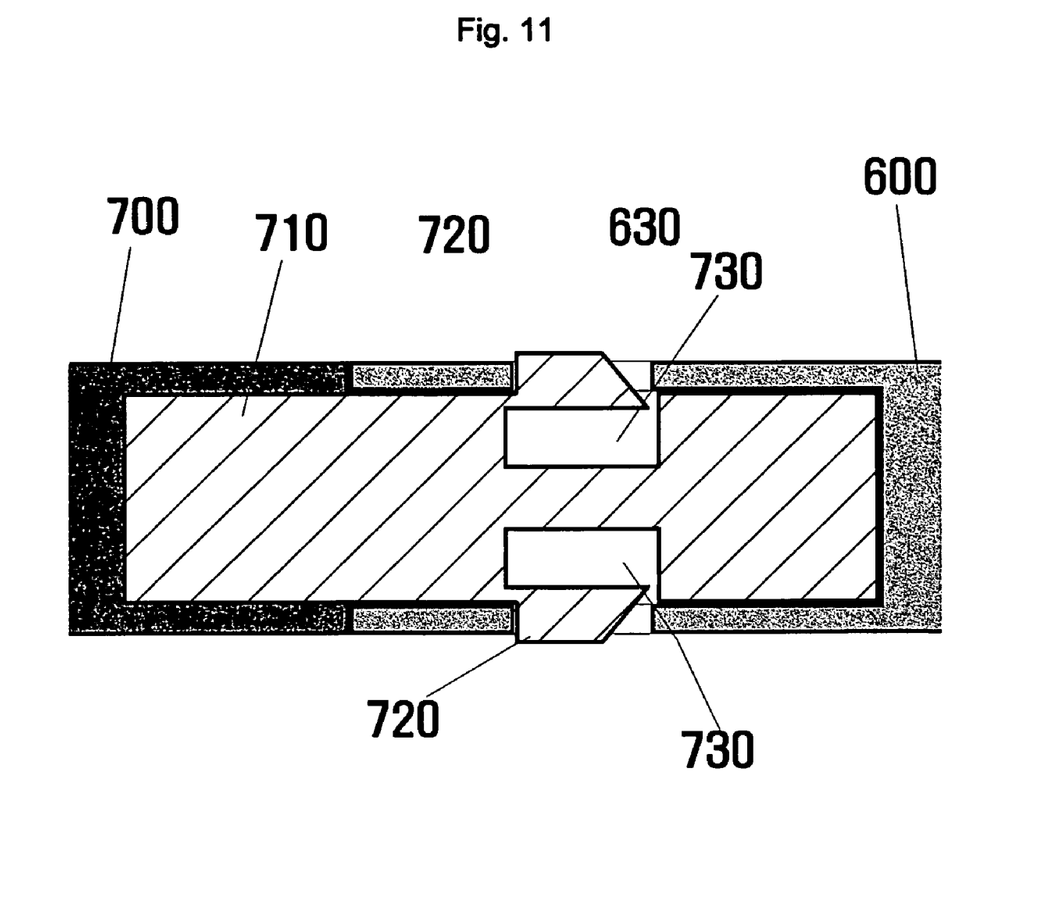
FIG. 11 is a partial horizontal cross-section view by a cutting plane horizontally passing the center of a frame side surface protrusion, of a state where the central frame of FIG. 10 is coupled with the clip or earpiece frame of FIG. 10.

Next, FIGS. 10 and 11 are showing another embodiments of the central frame 600, and clip or earpiece frame 700 forming glasses having a frame for a combined use with a cap according to the present invention. As the central frame of FIG. 4, in the central frame 600, a glasses body coupling unit 610 in which both side ends are connected by a hole so that the reinforce unit 102 of the main body of FIG. 3 can be inserted into and coupled with the hole, is formed at the lower part of the central frame 600. On the upper part of each of both side surfaces of the central frame 600, a frame insert insertion hole 620 to which a frame insert 710 formed on an inner side surface of the clip or earpiece frame 700 is inserted is formed. Also, on each of both side surfaces of the frame insert insertion hole 620, an insert hanging protrusion coupling hole 630 to be coupled with an insert hanging protrusion 720 formed on each side surface of the frame insert 710 is formed. At this time, FIG. 10 shows that when the main body of the glasses has the reinforce unit 102 as shown in FIG. 3, the glasses body coupling unit 610 into which the reinforce unit is inserted is formed. However, when the shape of the main body of the glasses 100' is formed as shown in FIG. 7, the glasses body coupling hole 111' as shown in FIG. 8 can also be formed.

Next, the clip or earpiece frame 700 has a gear 215, and if a stopper 220 and a clip 230 are coupled with the frame 700 on top of the frame 700, the frame 700 becomes a clip frame, and if a rotation member 320 and an earpiece body 330 are installed, then it becomes an earpiece. Accordingly, FIG. 10 shows only the basic structure of a clip and earpiece frame 700 having an identical shape, and the sectional shape of the clip or earpiece frame 700 is formed to be the same as that of the central frame 600. On the bottom surface of the frame 700, a glasses body coupling unit (not shown) with a predetermined depth is formed such that the reinforce unit 102 of the main body of the glasses shown in FIG. 3 can be coupled through the inner side end. At this time, when the shape of the main body of the glasses 100' is formed as shown in FIG. 7, the glasses body coupling hole 111' can be formed.

Also, on the upper part of the inner side surface of the frame 700, the frame insert 710 that is inserted into the frame insert insertion hole 620 of the central frame 600 is formed. The frame insert 710 can be formed integrally with the clip or earpiece frame 700 by an injection molding method, or can be formed by inserting an aluminum bar by an insert injection molding method. Also, the frame insert 710 is formed in the form of a rectangular pillar as shown and on both side surfaces of the frame insert 710, insert hanging protrusions 720 which is coupled with the insert hanging protrusion coupling hole 630 are formed. For the insert hanging protrusion 720, a hanging protrusion floating hole 730 is formed on each side surface of the frame insert 710 to provide a room bigger than the hanging protrusion 720, and the hanging protrusion 720 is formed integrally with the frame insert such that when a pressure is applied, the hanging protrusion 720 can float to the inside of the hanging protrusion floating hole 730. At this time, the hanging protrusion 720 can be made to have its own elasticity depending on the material quality of the insert.

The process for coupling the thus formed central frame 600 with the clip or earpiece frame 700 will now be explained. First, if the insert hanging protrusion 720 of the clip or earpiece frame 700 is inserted and pushed into the frame insert insertion hole 620 of the central frame 600, the hanging protrusion 720 is pushed inside the frame insert insertion hole 620 with being pushed inside the hanging protrusion floating hole 730. At this time, if the insert hanging protrusion 720 is positioned at the insert hanging protrusion coupling hole 630 on the side surface of the frame insert insertion hole, the insert hanging protrusion 720 is robustly coupled by its own elasticity with the hanging protrusion coupling hole 630, and as a result, the central frame 600 and the clip or earpiece frame 700 are coupled with each other.

Also, in order to detach the clip or earpiece frame 700 from the central frame 600, while the coupled inserted hanging protrusion 720 is being pushed by fingers, the clip or earpiece frame 700 is pulled outwardly such that the frame 700 is detached from the central frame 700.

FIGS. 3 through 11 show just embodiments for explaining glasses having a frame for a combined use with a cap of the present invention. The frame insert insertion hole 620 of the central frame, and the insert 710 of the clip and earpiece frame can be formed in a round or rectangular pillar shape, and the insert hanging protrusion 720 can be formed in a variety of shapes.

According to the glasses having a frame for a combined use with a cap of the present invention as described above, the clip and earpiece can be easily attached and detached manually without any tools such that the glasses can be used conveniently for a variety of purposes.

Also, the reinforce unit or hanging threshold is formed on the top end of the main body of the glasses, and the central frame and clip or earpiece frame are coupled with the reinforce unit or hanging threshold. By doing so, even when the wearer performs heavy exercise or the shape of the visor of a cap is changed, the clip or earpiece is prevented from being easily separated upward or downward or aside from the main body of the glasses.

In addition, even though the thickness of the main body of the glasses is formed to be thin, if the central frame and the clip and earpiece frame are coupled with the upper part of the main body, the main body of the glasses can be prevented from being deformed even when an external impact is applied. By doing so, the unique shape of the glasses can be maintained and a breakdown of the glasses by repetition of shape changes can be prevented in advance.

Also, when any one of the clip, the earpiece, and the main body is damaged, only the damaged part can be purchased for replacement such that the maintenance cost can be saved, which provides an economical advantage.

Among a variety of possible embodiments, the embodiments disclosed here are selected as preferred examples to help understanding of those skilled in the art. It is noted that the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

What is claimed is:

1. Glasses for dual use of being retained on ears of a person or being attached to a cap worn by the person, comprising:
    a main body of said glasses which has a lens unit and a reinforce unit thickly formed integrally with the lens unit, on top of the lens unit;
    a central frame which is fixed to the reinforce unit at the top of the main body of the glasses; and
    one of a pair of clips and a pair of earpieces;
    said pair of clips each having a clip frame which is inserted inwardly and coupled with an end of the reinforce unit of the main body of the glasses, and in which a frame fixing panel that is coupled with the central frame is integrally formed on an inner top end of the clip frame, and a clip unit for adjusting an angle of the main body of the glasses, on a top surface of the clip frame, wherein each of said clips can be clipped to a cap; and
    said pair of earpieces each having an earpiece frame which is inserted inwardly and coupled with an end of the reinforce unit of the main body of the glasses, and in which a frame fixing panel that is coupled with a coupling unit of the central frame is integrally formed on a top end of an inner side of the earpiece frame, and an earpiece body which is connected outwardly to the earpiece frame rotatably by a rotation member, wherein each of said earpieces can be worn on an ear of a person wearing said glasses.

2. The glasses of claim 1, wherein a vertical section of the reinforce unit is a circle or a polygon and the reinforce unit has a bar shape.

3. The glasses of claim 1, wherein the central frame comprises:
    a glasses body coupling unit which is formed inside of a lower part of the central frame as a hole connecting both ends of the central frame so that the central frame is coupled with the reinforce unit of the main body of the glasses;
    a frame fixing panel protrusion fixing hole which is formed on one side of a frame fixing panel coupling unit on a top surface of each of both ends of the central frame; and
    a clip or earpiece frame insert insertion hole with a predetermined depth formed on each of both side surfaces of the central frame,
    and the clip or earpiece frame further comprises:
    a glasses body insertion unit which is formed on a bottom surface of the clip or earpiece frame so that the clip or earpiece frame is coupled with the reinforce unit of the main body of the glasses;
    a frame insert which is formed on an inner side surface and inserted into the frame insert insertion hole of the central frame; and
    a frame fixing panel protrusion which is formed on a bottom surface of the frame fixing panel and is coupled to the frame fixing panel protrusion fixing hole of the central frame.

4. The glasses of claim 3, wherein the frame insert formed on the clip or earpiece frame is formed by an insert injection molding method by using metal.

5. The glasses of claim 1, wherein the clip unit of the clip comprises:
    a gear which is formed integrally on top of the clip frame;
    a stopper for controlling rotation of the gear; and
    a clip body which has internally the stopper and has an axis bearing unit and a fixing axis for fixing the gear.

6. The glasses of claim 1, further comprising:
    a nose pad with a soft quality which is formed in a reverse V shape, and in which a glasses body insertion groove is formed along the outer-circumference surface.

7. Glasses for dual use of being retained on ears of a person or being attached to a cap worn by the person, comprising:
    a main body of said glasses which has a lens unit and a hanging threshold with a predetermined size formed integrally with the lens unit, on top of each of both ends of the lens unit;
    a central frame which is fixed to the center of the top of the main body of the glasses; and
    one of a pair of clips and a pair of earpieces,
    said pair of clips each having a clip frame which is inserted into and coupled with one of both ends of the hanging threshold, and in which a frame fixing panel that is coupled with the central frame is integrally formed on an inner top end of the clip frame, and a clip unit for adjusting an angle of the main body of the glasses on a top surface of the clip frame, wherein each of said clips can be clipped to a cap; and
    said pair of earpieces each having an earpiece frame which is inserted inwardly from each of both ends of the main body of the glasses to be coupled with the hanging threshold, and in which a frame fixing panel that is coupled with a coupling unit of the central frame is integrally formed on a top end of an inner side surface of the earpiece frame, and an earpiece body which is connected outwardly to the earpiece frame rotatably by a rotation member, wherein each of said earpieces can be worn on an ear of a person wearing said glasses.

8. The glasses of claim 7, wherein the central frame comprises:
a glasses body coupling unit which is formed inside of a lower part of the central frame as a hole connecting bath ends of the central frame so that the central frame is coupled with the main body of the glasses;
a frame fixing panel protrusion fixing hole which is formed on one side of a frame fixing panel coupling unit on a top surface of each of both ends of the central frame; and
a clip or earpiece frame insert insertion hole with a predetermined depth formed on each of both side surfaces of the central frame,
and the clip or earpiece frame further comprises:
a glasses body hanging threshold insertion hole which is formed on a bottom surface of the clip or earpiece frame so that the clip or earpiece frame is coupled with the hanging threshold of the main body of the glasses;
a frame insert which is formed on an inner side surface and inserted into the frame insert insertion hole of the central frame; and
a frame fixing panel protrusion which is formed on a bottom surface of the frame fixing panel and is coupled to the frame fixing panel protrusion fixing hole of the central frame.

9. The glasses of claim 7, wherein the clip unit of the clip comprises:
a gear which is formed integrally on a top of the clip frame;
a stopper for controlling rotation of the gear; and
a clip body which has internally the stopper and has an axis bearing unit and a fixing axis for fixing the gear.

10. The glasses of claim 7, further comprising:
a nose pad with a soft quality which is formed in a reverse V shape, and in which a glasses body insertion hole is formed on the outer-circumference surface.

11. Glasses for dual use of being retained on ears of a person or being attached to a cap worn by the person, comprising:
a main body of said glasses which has a lens unit and a reinforce unit thickly formed integrally with the lens unit, on top of the lens unit;
a central frame which is fixed to the center of the top end of the main body of the glasses, and in which a frame insert insertion hole having an insert hanging protrusion coupling bole formed at each side surface is disposed at each of both side ends of the central frame; and
one of a pair of clips and a pair of earpieces,
said pair of clips, each having a clip frame which is inserted inwardly and coupled with an end of the reinforce unit of the main body of the glasses, and in which a frame insert having an insert hanging protrusion formed on each of both side surfaces is disposed on an inner side surface of the clip frame, and a clip unit for adjusting an angle of the main body of the glasses, formed on and coupled with a top surface of the clip frame, wherein each of said clips can be clipped to a cap; and said pair of earpieces each having an earpiece frame which is inserted inwardly and coupled with an end of the reinforce unit of the main body of the glasses, and in which a frame insert having an insert hanging protrusion formed on each of both side surfaces is disposed on an inner side surface of the earpiece frame, and an earpiece body which is connected rotatably by a rotation member disposed outside of the earpiece frame, wherein each of said earpieces can be worn on an ear of a person wearing said glasses.

12. The glasses of claim 11, wherein the frame insert is formed in a round or rectangular pillar shape by an injection molding method or an insert injection molding method, and a hanging protrusion floating hole is further formed on an inner side of to insert hanging protrusion.

13. Glasses for dual use of being retained on ears of a person or being attached to a cap worn by the person, comprising:
a main body of said glasses which has a lens unit and a hanging threshold with a predetermined size formed integrally with the lens unit, on top of each of both ends of the lens unit;
a central frame which is fixed to the center of the top of the main body of the glasses, and in which a frame insert insertion hole having an insert hanging protrusion coupling hole formed at each inner side surface is disposed at each of both side ends of the central frame; and
one of a pair of clips and a pair of earpieces,
said pair of clips each having a clip frame which is inserted and coupled with one of both ends of the hanging threshold of the main body of the glasses, and in which a frame insert having an insert hanging protrusion formed on each of both side surfaces is disposed on an inner side surface of the clip frame, and a clip unit for adjusting an angle of the main body of the glasses, formed on and coupled with a top surface of the clip frame, wherein each of said clips can be clipped to a cap; and
said pair of earpieces each having an earpiece frame which is inserted and coupled with an end of the hanging protrusion of the main body of the glasses, and in which a frame insert having an insert hanging protrusion formed on each of both side surfaces is disposed on an inner side surface of the earpiece frame, and an earpiece body which is connected rotatably by a rotation member disposed outside of the earpiece frame, wherein each of said earpieces can be worn on an ear of a person wearing said glasses.

14. The glasses of claim 13, wherein the frame insert is formed in a round or rectangular pillar shape by an injection molding method or an insert injection molding method, and a hanging protrusion floating hole with a depth in which the hanging protrusion is capable of floating is further formed on an inner side of the insert hanging protrusion.

* * * * *